May 18, 1954  J. V. DAVIS  2,678,719
ROTARY TABLE STRUCTURE
Filed July 20, 1949  4 Sheets-Sheet 1

INVENTOR.
JOHN V. DAVIS.
BY
ATTORNEY.

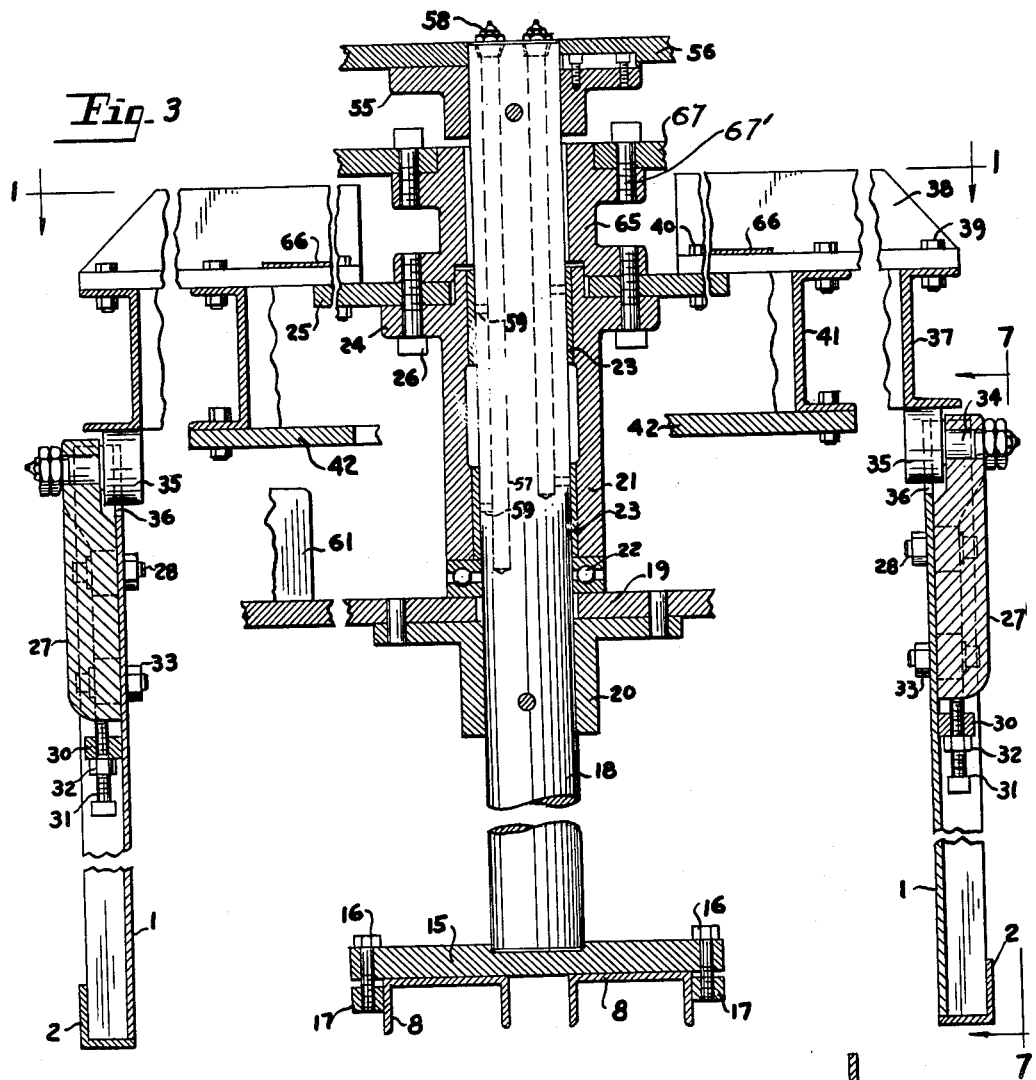
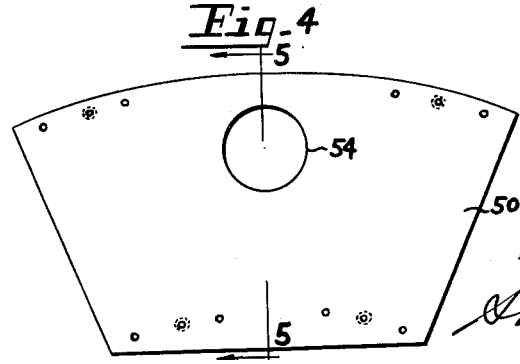
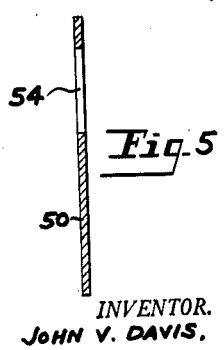

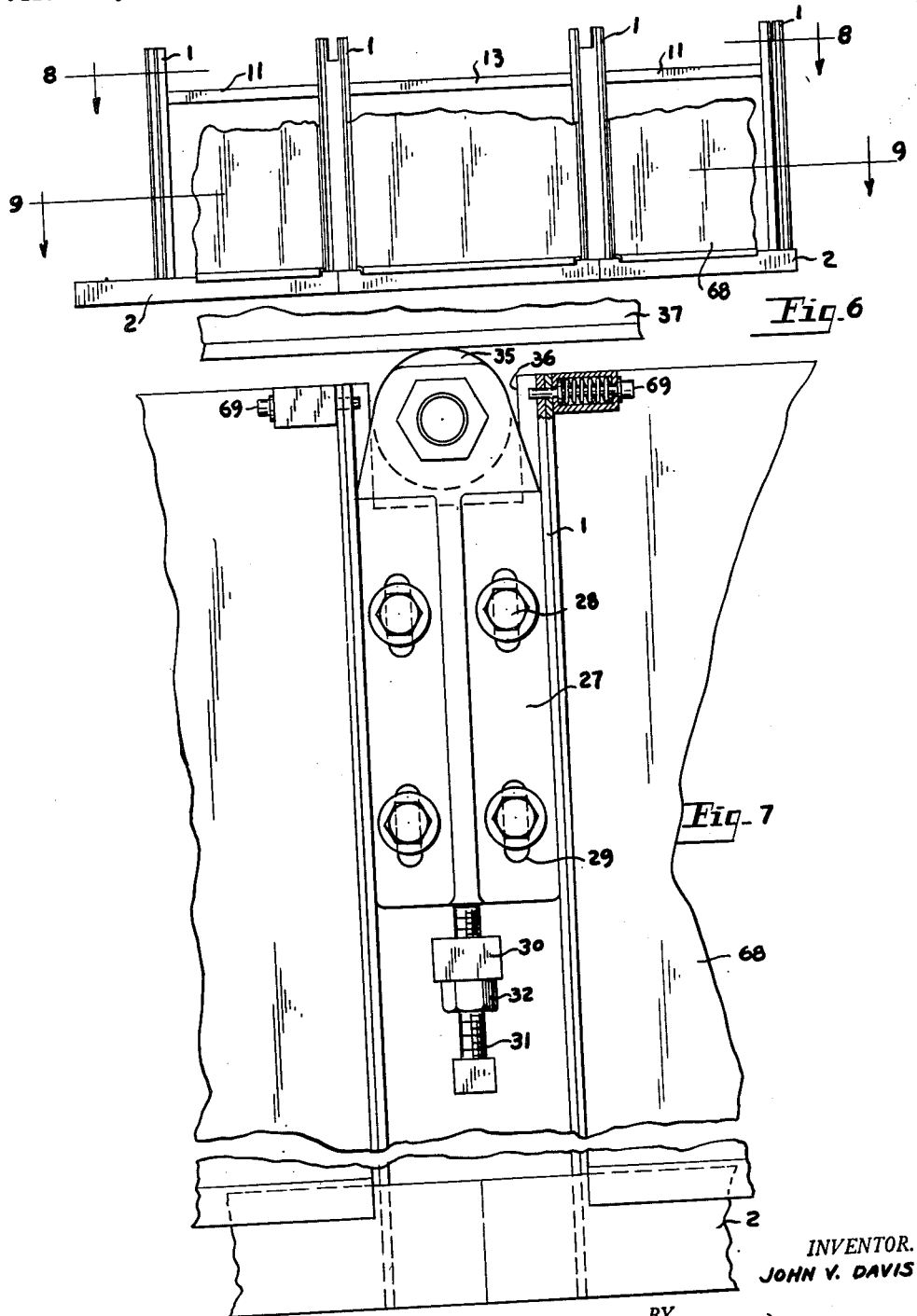

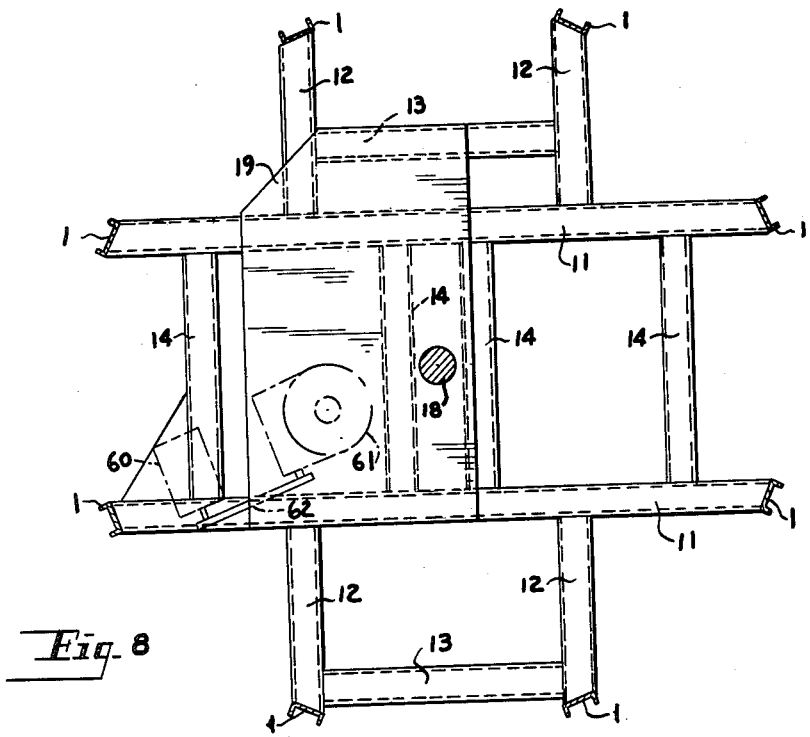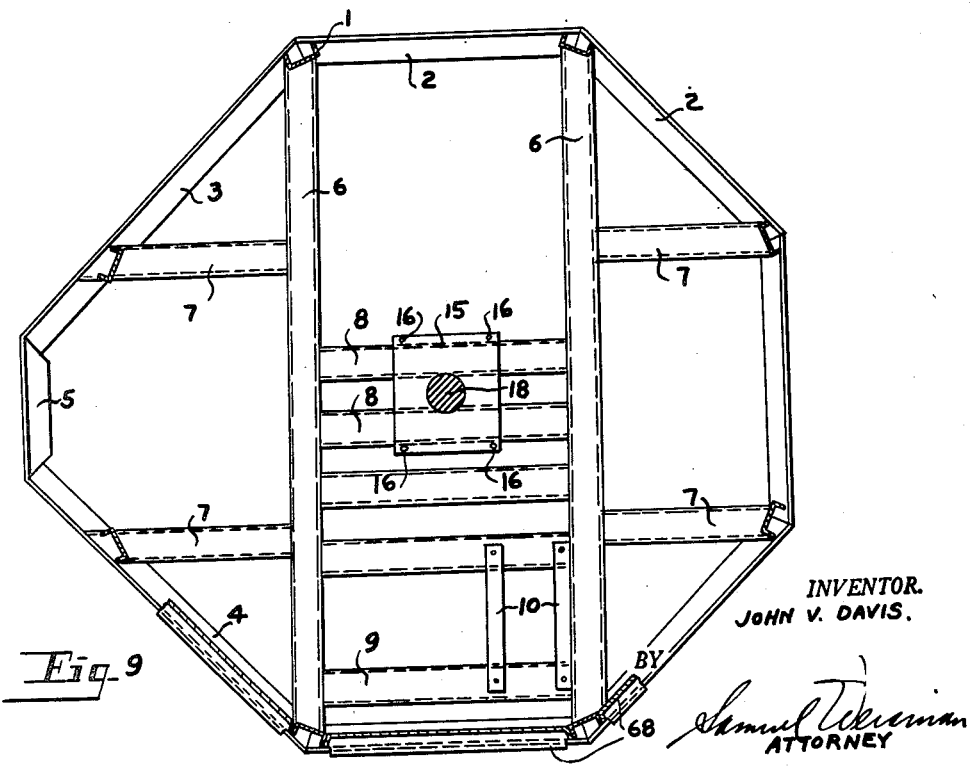

Patented May 18, 1954

2,678,719

UNITED STATES PATENT OFFICE 2,678,719

ROTARY TABLE STRUCTURE

John V. Davis, Detroit, Mich., assignor to The Udylite Corporation, Detroit, Mich., a corporation of Delaware Application July 20, 1949, Serial No. 105,749

9 Claims. (Cl. 198—209)

The present invention pertains to a novel rotary table for carrying work on which mechanical operations are to be performed. The rotary top of the table carries fixtures on which the work pieces are mounted, and the pieces are thus brought by an intermittent motion to the machines by which they are worked on.

One of the objects of the invention is to provide a table structure that is rigid and well braced without being too heavy. Another object is to provide means for accurately levelling the table top.

The first object is accomplished by the use of a skeleton structure consisting of horizontal and vertical bars arranged in such a manner as to provide a high degree of rigidity. Wall plates are detachably mounted on the skeleton or framework to form an enclosed structure and yet permit easy accessibility to the interior thereof.

In connection with the second object it is extremely important to have the table top perfectly level in order that the work pieces may come into proper alinement with the stationary machines. Where the table top is large, it is likely to become warped or distorted, and it is then practically impossible to level it satisfactorily.

This difficulty is overcome in the present invention by constructing the table top in sections, one section for each fixture, with individual means for levelling each section. The sections or fixture plates lie upon an outer ring and an inner ring. Each section is provided at each of its corners with an adjusting screw bearing on one of the rings. Bolts are passed through the plates and adjacent rings and are tightened when the proper adjustment has been made.

Further, the framework of the table includes a series of outer uprights. In each upright is mounted a vertically adjustable bracket carrying a roller, with means for locking the desired adjustment. The rollers are in a circular series, and the aforementioned outer ring rides thereon. Thus, the rotary table top is first levelled bodily by adjustment of the brackets, and the fixture plates are then levelled individually, as required, in the manner previously set forth.

The inner and outer rings, in conjunction with radial spokes secured to them, constitute a rigid frame for the table top. The inner ring serves the additional purpose of carrying a Geneva wheel to which the intermittent motion is applied.

The invention is fully disclosed by way of example in the following description and in the accompanying drawings in which Figure 1 is a plan view of the machine, on the line 1—1 of Figure 3;

Figure 3 is a section on the line 3—3 of Figure 1;

Figure 4 is a plan view of one of the fixture plates;

Figure 5 is a section on the line 5—5 of Figure 4;

Figure 6 is a side elevation of the framework;

Figure 7 is a section on the line 7—7 of Figure 3;

Figure 8 is a section on the line 8—8 of Figure 6;

Figure 9 is a section on the line 9—9 of Figure 6.

Reference to these views will now be made by use of like characters which are employed to designate corresponding parts throughout.

Figure 1:
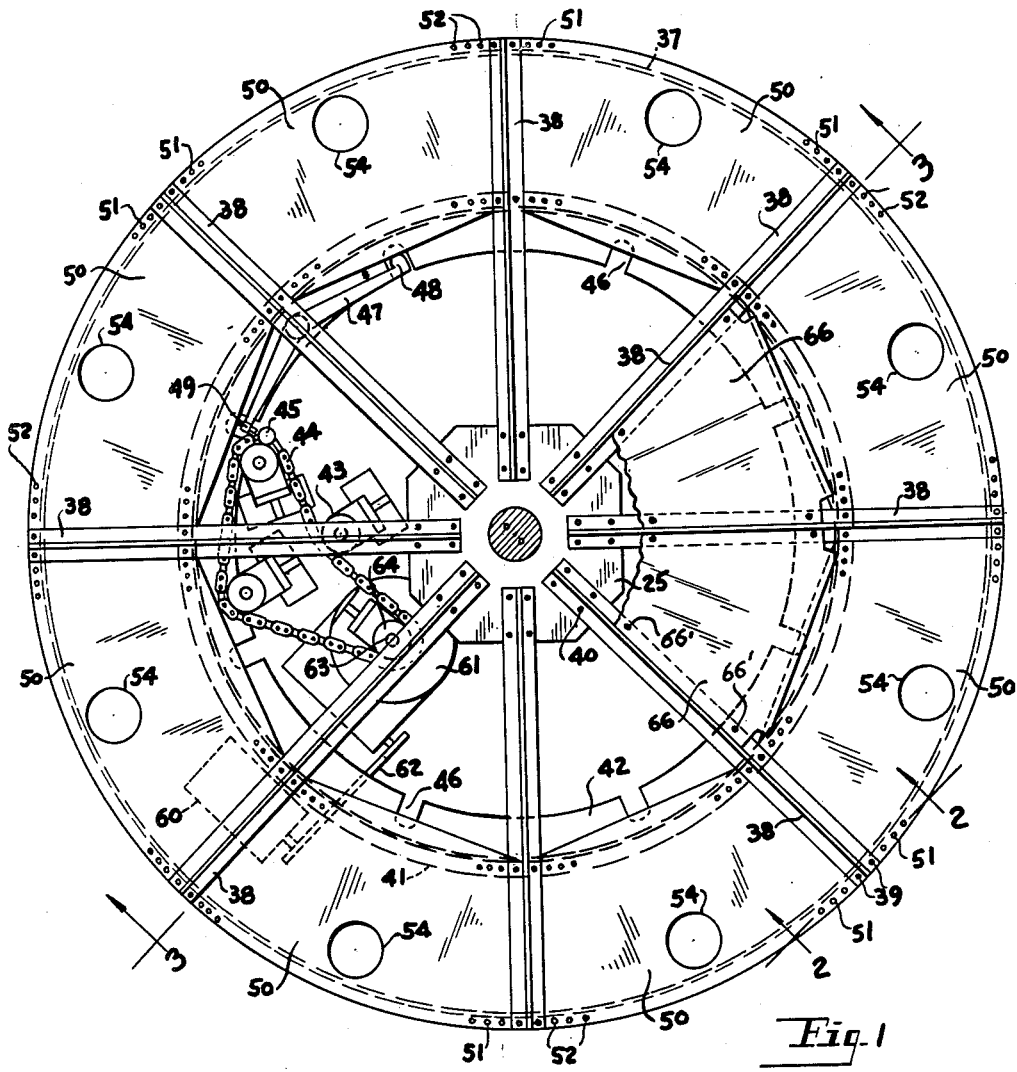
Figure 2:
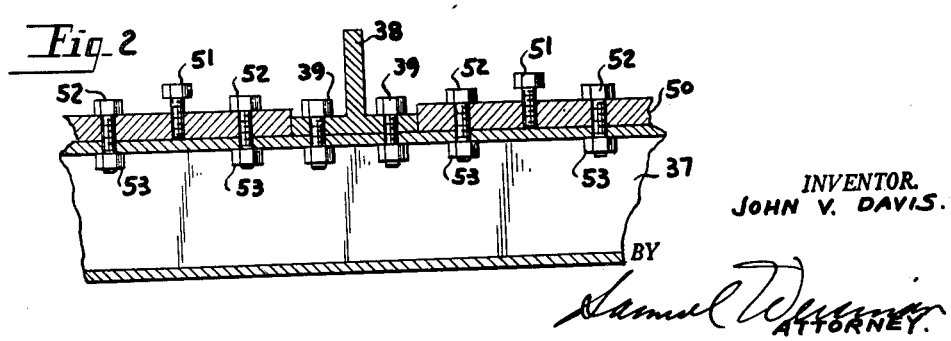
Figure 2 is a section on the line 2—2 of Figure 1.

The base structure of the machine is shown in Figure 9. A number of channel irons 1 are erected preferably at the vertices of a regular polygon. These are joined at their lower ends by angle irons 2 which meet at the channels, with the exception of two alternate angle irons 3 and 4. The latter are prolonged beyond and between two consecutive channels and are joined by a shorter side 5. The enclosure formed by the members 2, 3, 4 and 5 is larger on one side of a given center line of the polygon than on the other side, for the purpose of accommodating certain equipment as will presently appear.

Two adjacent members 1 are joined respectively to the opposite members 1 by downwardly facing channel irons 6 in or near the plane of the angle irons. The remaining members 1 are joined to the members 6 by similar channels 7 which preferably lie perpendicular to the members 6. A firm and rigid bottom structure is thereby obtained. The joints are preferably welded except where otherwise described.

The members 6 are joined to each other along a portion of their length by a series of spaced and downwardly facing channels 8. One or two additional connecting channels 9 are spaced from the members 8, and the space is bridged by a pair of straps 10. The members 8, 9 and 10 serve to support apparatus within the framework.

Somewhat below their upper ends, the uprights 1 are braced by an upper framework. Two consecutive members 1 are joined respectively to the opposite members 1 by longitudinal bars 11 preferably in the nature of inverted channel irons. The last named members 1 are not those that are joined by the irons 6, but are selected so that the members 11 are angular and preferably perpendicular to members 6. The uprights are thereby more uniformly braced and tied for substantially equal strength in all directions.

The uprights 1 which are not joined to each other by the bars 11 are joined to the latter by perpendicular bars or irons 12. Consecutive and parallel members 12 are inter-connected by bars 13 parallel to the members 11. The members 11 are inter-connected by spaced bars 14 perpendicular thereto and parallel to each other. A rigid upper framework is thereby provided to withstand the stresses and strains developed in the upper part of the machine, as will presently appear.

A mounting plate 15 is laid on the members 3 at the center of the polygon defined by the members 1. The plate 15 is secured by bolts 16 passed therethrough and threaded into ears 17 welded to the members 8, as shown in Figure 3. A vertical post 18 is seated in the plate 15.

On the upper framework shown in Figure 8 is secured another mounting plate 19 for a purpose that will presently appear. A bearing 20 for the post 18 (Figure 3) is suspended from the plate 19 through which the post also passes, whereby the post is maintained in an upright position.

A sleeve 21 is rotatably mounted on the post 18 over the plate 19 and rests on a ball bearing 22 upon the plate. The sleeve 21 contains liners 23 engaging the post. The upper end of the sleeve 21 is flanged at 24, and upon the flange is fastened hub plate 25 by bolts 26.

In each of the outwardly facing upright channels 1 is mounted a slide bracket 27 (Figure 7) which is preferably of T cross-section. Bolts 28 fastened in the uprights 1 pass through vertical slots 29 in the brackets 27. Each upright carries an ear 30 in which is threaded a vertical screw 31 engaging the bottom of the corresponding bracket, whereby the latter is adjusted vertically when the bolts 28 are loosened. When the proper adjustment has been made, a lock nut 32 on the screw 31 and nuts 33 (Figure 3) on the bolts 28 are tightened.

Each of the brackets 27 carries a horizontal axle 34 on which is mounted a roller 35 at the inner side of the bracket and projecting beyond the upper end thereof. The upper end of the corresponding upright 1 is suitably relieved at 36 to accommodate the roller.

An outer ring 37 (Figure 3) is mounted on the rollers 35 to ride thereon. A number of radial spokes 38 are bolted at 39 to the ring 37 and again at 40 to the center plate 25.

An inner ring 41 is suspended from the spokes 38 in concentric relation to the post 18 and ring 37. The ring 41 braces the spokes and also supports a Geneva wheel 42 which serves the purpose described in my copending Patent Number 2,486,128 of October 25, 1949. In this connection, Figure 1 shows a roller 43 which guides a sprocket chain 44. The chain carries a pin 45 adapted to engage successively in slots 46 in the wheel 42 to impart intermittent movement to the wheel 42, the rings 41 and 37, the spokes 38 and parts carried by this structure as will presently be shown. To the wheel 42 is vertically attached a lever 47 having one end 48 adapted to lock in a slot 46 and its other end 49 overlapping the adjacent slot. When the pin 45 enters the last named slot, it rocks the lever 47 to withdraw the end 48 from its slot and thereby permit the wheel 42 to turn. Between movements the end 48 holds the wheel 42 stationary.

Between each pair of consecutive spokes 38 is laid a fixture plate 50 lying between the rings 37 and 41. Each corner of the plate 50 carries a leveling screw 51 bearing upon the ring 37 or 41 beneath it. Locking bolts 52 are provided at both sides of each screw 51 and pass through the underneath ring. When a plate has been properly levelled by the screws 51, it is locked in position by the nuts 53 screwed on the bolts 52 and engaging the flanges of the rings 37 and 41.

The circles 54 on each plate 50 represent a work-supporting fixture which is not a part of the invention. The upper exposed end of the post 18 carries a collar 55 (Figure 3) on which is mounted a cam 56 which operates apparatus in conjunction with the fixtures set in the circles 54 and which also do not constitute a part of this invention.

Longitudinal passages 57 are drilled in the post 18 from its upper end and are covered by lubrication nipples 58. Radial ports 59 extend from the top edges to the sleeves 23.

Upon the plate 19 is mounted an electric motor 60 connected to a gear box 61 by a belt 62. The shaft 63 of the gear box drives one of the sprockets 64 and hence the chain 44.

A double collar 65 (Figure 3) loosely surrounding the post 18 is secured upon the center or hub plate 25 by the bolts 26. Upon the collar 65 is secured a plate 67, by bolts 67', associated with the operation of the fixtures. On the uncovered parts of the spokes are laid sectoral plates 66, extending to the fixture plates 50 and preferably fastened by screws 66' to the spokes 38. The plates 66 are thus easily removed for access to the interior of the machine from the top.

The spaces between the uprights 1 are enclosed by walls plates 68. These plates are easily demountable and, for this purpose, are held in position by spring latches 69 carried by and entering the flanges of the uprights. The larger side of the frame structure defined by the members 3, 4 and 5 is preferably enclosed in a hood also demountably held.

In the use of the machine, the table top represented by the portion riding on the rollers 35 is intermittently turned through the Geneva wheel 42 as already indicated. In this manner the fixtures at the stations or circles 54 are brought to the machines that operate on work carried by the fixtures. It is important, therefore, that the plates 50 move in a constant and horizontal plane. It has hitherto been difficult to maintain the surface of a rotary table in perfect alinement because of its large size, its weight, and the warping or other deformations in a large and heavy structure. This is especially true if the top of the table consists of a single plate of metal, as is commonly the case.

The aforementioned difficulties are eliminated in the instant machine by the individual adjustment of the rollers 35 by their brackets 37 and of the plates 50 by the screws 51 at the corners thereof. Thus, the table top is adjustable independently at several areas thereof and in several points of its mounting. A deformation in any particular area may be corrected without requiring adjustment of the entire table. Such adjustability eliminates the extremely difficult problem of adjusting the entire table top as a unit.

Although a specific embodiment of the inven-

What I claim is:

1. A rotary table comprising a vertical supporting structure, a circular series of rollers carried thereby, a table top frame mounted on said rollers, a circular series of table top plates mounted on said frame, means for individually adjusting the plane of each of said plates with respect to said frame, and means for locking each of said plates in its adjusted position.

2. A rotary table comprising a vertical supporting structure, a circular series of rollers carried thereby, means for adjusting the vertical position of the individual rollers on said structure, a table top frame mounted on said rollers, a circular series of table top plates mounted on said frame, means for individually adjusting the plane of each of said plates with respect to said frame, and means for locking each of said plates in its adjusted position.

3. A rotary table comprising a vertical supporting structure, a circular series of rollers carried thereby, a table top frame mounted on said rollers, a circular series of table top plates mounted on said frame, a levelling screw in the corner area of each plate and bearing on said frame for individually adjusting the plane of each of said plates with respect to said frame, and means for locking each of said plates in its adjusted position.

4. A rotary table comprising a vertical supporting structure, a circular series of brackets vertically adjustable on said structure, a roller carried by each bracket, a table top frame mounted on said rollers, a circular series of table top plates mounted on said frame, a levelling screw in the corner area of each plate and bearing on said frame, and means for locking said plates in their adjusted positions.

5. A rotary table comprising a base, a circular series of uprights thereon, a bracket vertically adjustable on each upright, a roller carried by each bracket, a table top frame mounted on said rollers, a circular series of table top plates mounted on said frame, means for individually levelling said plates, and means for locking said plates in their adjusted positions.

6. A rotary table comprising a vertical supporting structure, a circular series of rollers carried thereby, means for adjusting the vertical position of the individual rollers on said structure, an outer ring mounted on said rollers, a post mounted in the center of said series, a sleeve rotatably mounted on said post, a hub plate carried by said sleeve, spokes joining said ring to said hub plate, an inner ring carried by said spokes, a Geneva wheel carried by said inner ring, table top plates mounted on said rings between said spokes, and means for individually levelling and locking said table top plates.

7. A rotary table comprising a vertical supporting structure, a circular series of rollers carried thereby, means for adjusting the vertical position of the individual rollers on said structure, an outer ring mounted on said rollers, a post mounted in the center of said series, a sleeve rotatably mounted on said post, a hub plate carried by said sleeve, spokes joining said ring to said hub plate, an inner ring carried by said spokes, a Geneva wheel carried by said inner ring, table top plates mounted on said rings between said spokes, levelling screws in said table top plates and bearing on said rings, and means for locking said plates in their adjusted positions.

8. A rotary table comprising a base, a circular series of uprights thereon, a bracket vertically adjustable on each upright, a roller carried by each bracket, a ring mounted on said rollers, a table top supported on said ring, a post mounted in the center of said series, a sleeve rotatably mounted on said post, a hub plate carried by said sleeve, spokes joining said ring to said hub plate, an inner ring carried by said spokes, a Geneva wheel carried by said inner ring, table top plates mounted on said rings between said spokes, and means for individually levelling and locking said table top plates.

9. A rotary table comprising a base, a circular series of uprights thereon, a bracket vertically adjustable on each upright, a roller carried by each bracket, a table top supported on said rollers, a ring mounted on said rollers, a post mounted in the center of said series, a sleeve rotatably mounted on said post, a hub plate carried by said sleeve, spokes joining said ring to said hub plate, an inner ring carried by said spokes, a Geneva wheel carried by said inner ring, table top plates mounted on said rings between said spokes, levelling screws in said table top plates and bearing on said rings, and means for locking said plates in their adjusted positions.

References Cited in the file of this patent

UNITED STATES PATENTS

| Number | Name | Date |
|---|---|---|
| 490,286 | Hollowell | Jan. 24, 1893 |
| 807,021 | Falk | Dec. 12, 1905 |
| 1,046,853 | Proal | Dec. 10, 1912 |
| 1,540,742 | Angell | June 9, 1925 |
| 1,740,831 | Patterson | Dec. 24, 1929 |
| 1,742,135 | Cornell | Dec. 31, 1929 |
| 1,764,182 | Rawson | June 17, 1930 |
| 1,862,485 | McEwan | June 7, 1932 |
| 2,043,969 | Kutchera | June 9, 1936 |
| 2,194,124 | Rhodes | Mar. 19, 1940 |
| 2,271,848 | Tcimpidis | Feb. 3, 1942 |
| 2,289,514 | Mastney et al. | July 14, 1942 |
| 2,415,201 | Zademach et al. | Feb. 4, 1947 |
| 2,419,484 | Danziger | Apr. 22, 1947 |